Oct. 23, 1956  K. M. HOLMAN ET AL  2,767,459
CUT OFF SAW
Filed Feb. 8, 1954  3 Sheets-Sheet 1

INVENTORS
Keith M. Holman
Fermore B. Cooper
BY

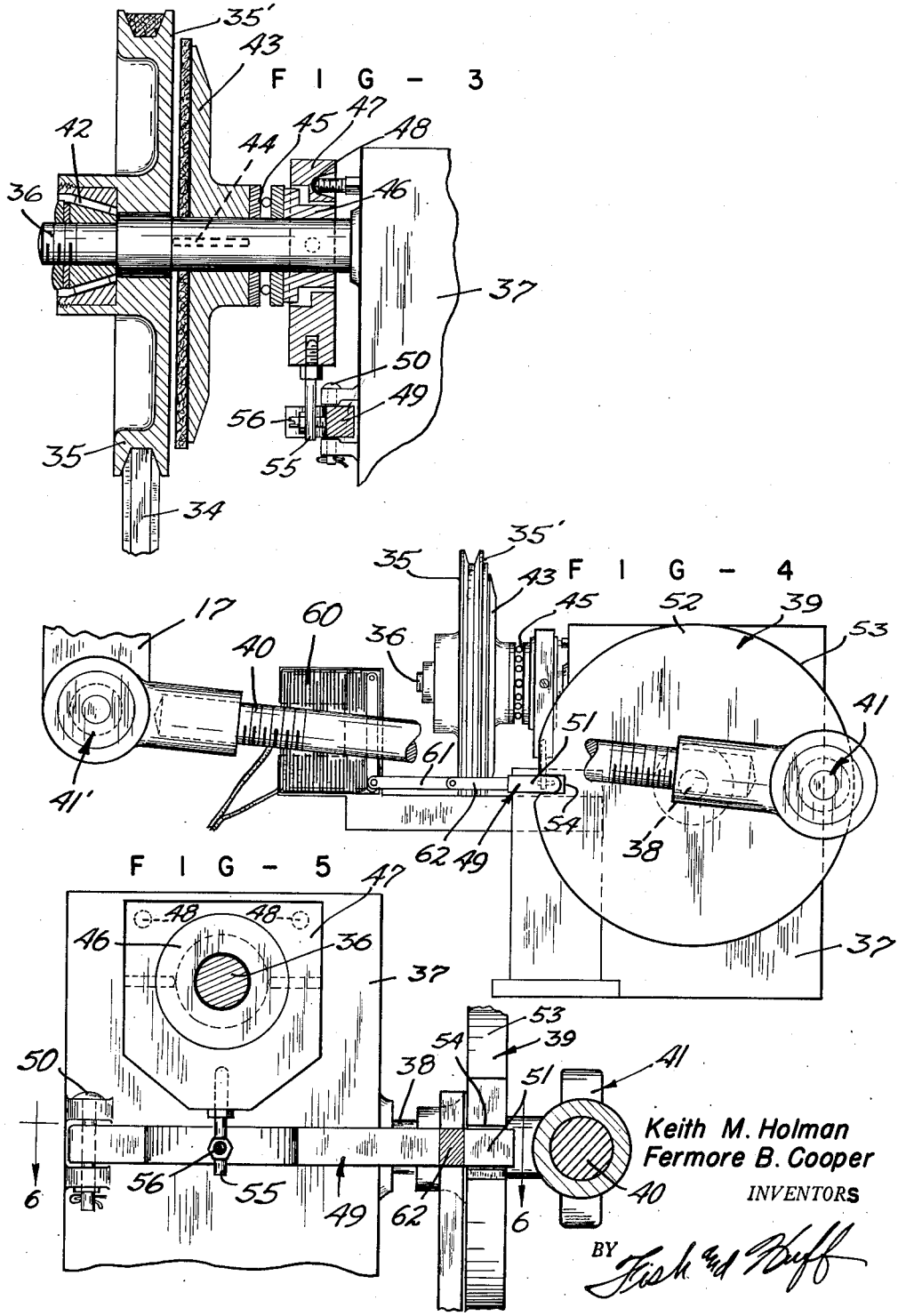

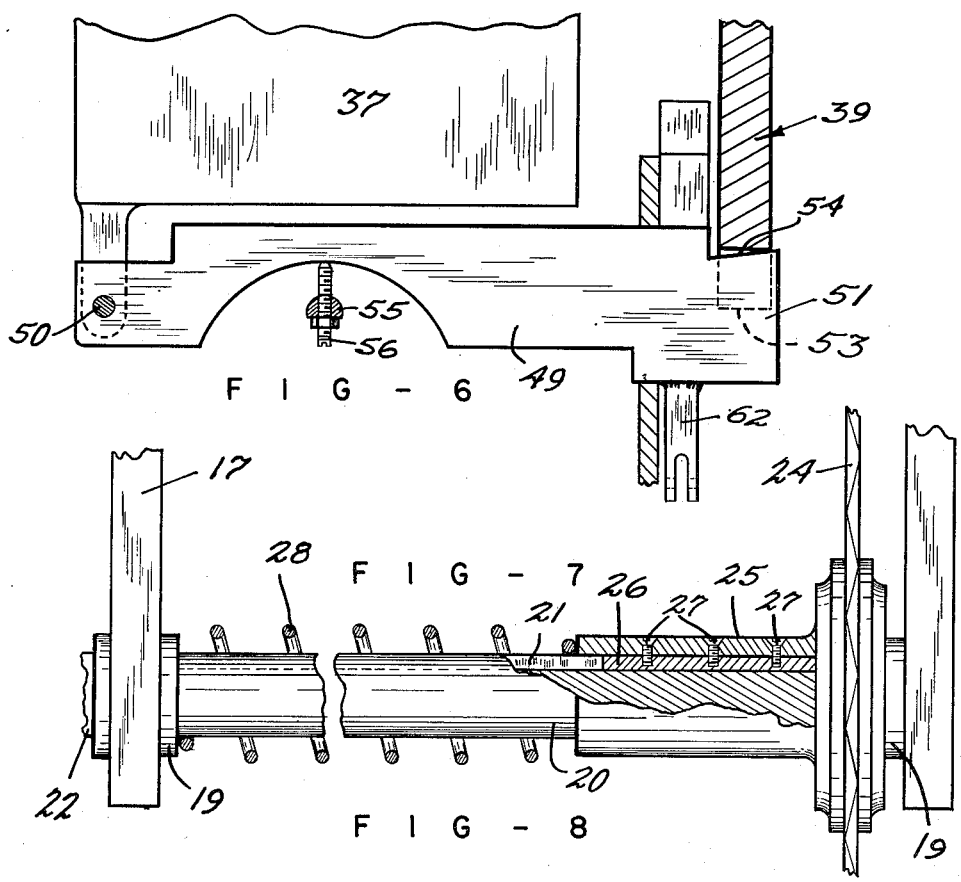

United States Patent Office 2,767,459
Patented Oct. 23, 1956

2,767,459

CUT OFF SAW

Keith M. Holman and Fermore B. Cooper, Spokane, Wash., assignors to Aluminum Supply Co., Spokane, Wash., a partnership consisting of Fermore B. Cooper and Keith M. Holman Application February 8, 1954, Serial No. 408,793

4 Claims. (Cl. 29—69)

This invention relates to cutting devices and more particularly to a cut off saw.

One object of the invention lies in the provision of a powered saw which is adaptable for automatic operation to cut predetermined lengths of material passing through the area included in the cutting stroke of the saw.

Another object of the invention lies in the provision of a cut off saw movable into and out of cutting relation with an object to be cut, said saw being capable of cutting the object during movement thereof transversely of the cut off movement of said saw.

Another object of the invention lies in the provision of an automatic cut off saw particularly adapted for cutting selected or predetermined lengths of longitudinally moving tubing or the like.

These and other objects of the invention will become apparent during the course of the following description.

In the accompanying drawing and the following description, the nature and advantages of this invention will appear more fully wherein a preferred form of the invention is disclosed. It should be understood however that the drawings and description are illustrative only and are not intended to limit the invention except insofar as it is limited by the claims.

In the drawings:

Figure 3 is a fragmentary vertical cross section as at line 3—3 of Figure 1;

Figure 4 is a fragmentary vertical side elevation of the cutting stroke motivating mechanism as at line 4—4 of Figure 1 and having parts broken away for convenience of illustration;

Figure 5 is a fragmentary vertical cross section as at line 5—5 of Figure 1;

Figure 6 is a fragmentary plan view with parts in cross section at at line 6—6 of Figure 5;

Figure 7 is a plan view partially in cross section showing the saw arbor and the associated saw blade; and, Figure 8 is a diagrammatic view showing the wiring diagram and actuating elements.

Figure 1:
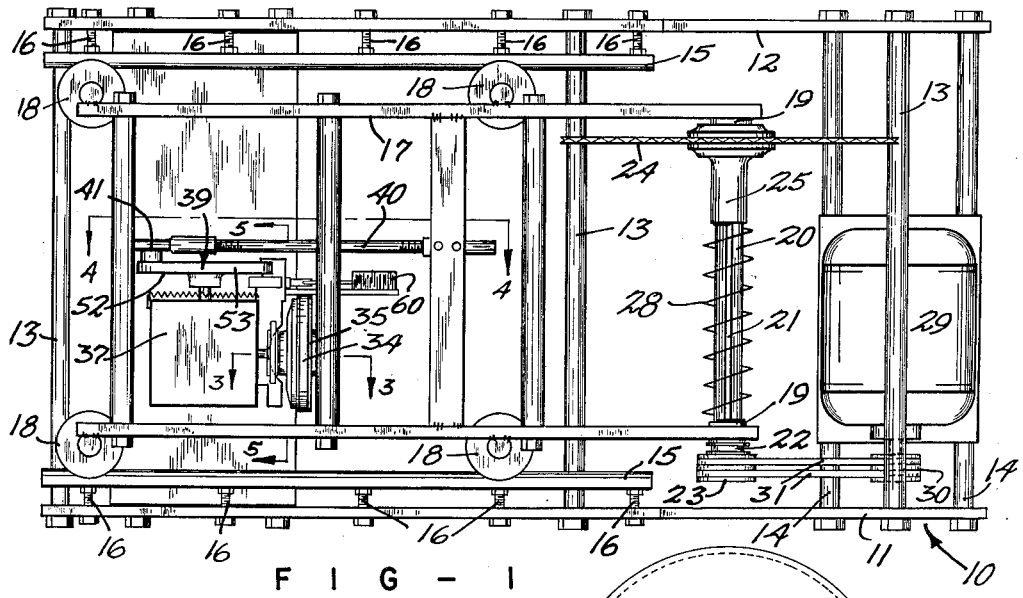
Figure 1 is a plan view of a cut off saw embodying our invention.

Referring now in detail to the drawings, the numeral 10 indicates a frame which may be of any desired construction but which is shown here to comprise a pair of horizontally spaced vertical side walls 11 and 12 suitably united by means of spacing bars or rods 13. Other spacing bars or rods 14 also secure the side walls 11 and 12 and form supporting means for various mechanical elements of the cut off saw.

Each wall 11 and 12 is provided with one of a pair of inwardly disposed horizontally extending parallel rails 15 each of which is adapted for adjustable horizontal positioning by means of a plurality of securing bolts 16.

A horizontally reciprocable table 17 is carried by rollers 18 cooperating with the rails 15 to support the table 17 and permit its reciprocation. The table 17 is provided at one end thereof with spaced horizontally aligned bearings 19—19 which support a saw arbor 20 with its axis disposed at right angles to the direction of movement of said table. The saw arbor, between the bearings 19, is provided with a longitudinal key way 21. One end 22 extends beyond the table 17 and supports a belt pulley or other power transmission means 23 secured thereto.

In the drawings we have shown a circular saw 24 carried by the saw arbor 20 for rotation thereby. The saw is secured to a sleeve-like hub 25 which encircles the arbor 20 and is longitudinally slidable thereon. To prevent the hub from rotating about the arbor 20 we have provided a key 26 which is secured within the sleeve 25 by means of a plurality of stud bolts 27 and, as is more particularly disclosed in Figure 7, the key 26 is disposed within the key way 22 thus providing means mounting the saw 24 rotatably fixed to the arbor 20 but longitudinally slidable thereon from one end to the other.

Figure 2:
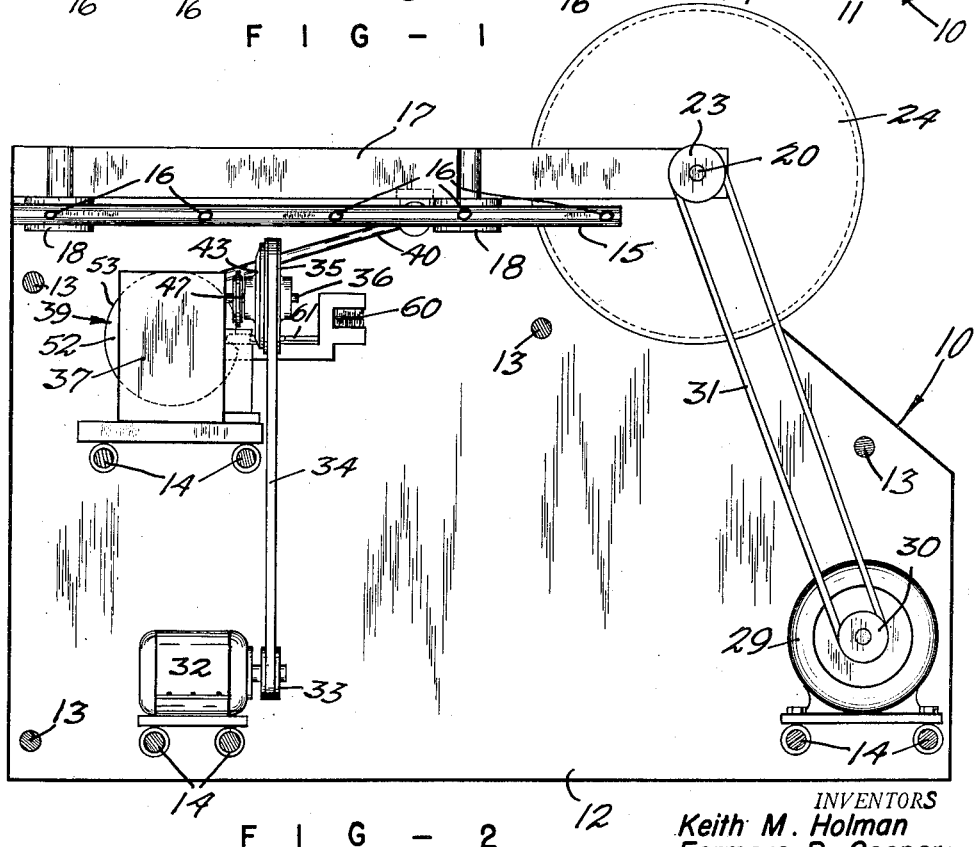
Figure 2 is a vertical cross section taken inside of the near side plate and looking toward the machine.

To maintain the saw 24 at a normal position located adjacent to one end of the arbor 20 we provide an expansion spring 28 which bears against one end of the sleeve 25 and at the opposed end against a bearing 19, thus yieldably urging the saw toward a normal biased position at one end of the arbor 20. As shown in Figures 1 and 2, certain of the spacing bars 14 support a power means, here shown to be an electric motor 29, which has a pulley 30 disposed in radial alignment with the pulley 23 of the arbor 20. Power transmission belts 31 are trained about the two pulleys 30 and 23 and by this means rotary movement is applied to the arbor 20. It will thus be seen that the saw 24 is rotated by means of the motor 29. By reason of the table 17 being reciprocable the saw is adapted for rectilinear movement over a path which we prefer to term a cutting stroke. Obviously, the table 17 may be shifted through the cutting stroke by manual means. However, we find it preferable to supply mechanically timed means to insure that the saw will be retracted and removed from the saw kerf before the saw reaches its limit of movement axially of the arbor 20.

Though not limited thereto, our cut off saw is admirably adapted for cutting off selected or predetermined lengths of continuous metal tubing axially advancing from a tubing forming machine.

As the table 17 is initially moved in the cutting stroke, the rapidly rotating saw 24 engages the moving object to be cut and forms a kerf in which the saw will continue to cut and rotate. As the object moves parallel with the axis of arbor 20 and toward the end opposed to the normal position of the saw 24 the side pressure of the saw kerf on the saw blade 24 causes the blade to move axially along the arbor 20 compressing spring 28. After the saw completes its outward cutting stroke movement, wherein the object is cut off, the table 17 is returned to its normal retracted position with the saw 24 removed from the object being cut and spring 28 returns the saw to its normal biased position at one end of the saw arbor 20.

Obviously, it is necessary that the cutting stroke movement of the table 17 be timed relative to the axial movement of the object being cut so that the saw 24 will be withdrawn prior to the saw reaching its movement limit along the arbor 20.

To provide means for moving the table 17 we supply a second electric motor 32. However, if desired, the power conceivably could be derived from the first power unit 29 and it is not necessary that two individual motors be provided. According to the structure shown in the drawings the motor 32 has a pulley 33 belted at 34 to an idler pulley 35 carried by the input shaft 36 of a power transmission reduction unit 37 which has an output shaft 38 carrying a bell crank 39 to which a push rod 40 is pivotally connected at 41. As the bell crank 39 is revolved, the push rod 40 traverses a rectilinear path and since it is pivotally secured at its free end 41' to the table 17, rotation of the bell crank 39 will cause the table 17 to traverse the rectilinear cutting stroke.

A novel means of properly driving the input shaft 36 of the transmission unit 37 is detailed in Figure 3 wherein it is shown that the pulley 35 is journaled by means of a radial thrust bearing 42 on the input shaft 36. A clutch plate 43 is splined or otherwise secured to the input shaft 36 as indicated at 44 and is normally disposed spaced from the flat clutch face 35' of the pulley 35. A thrust bearing 45 encircles the input shaft 36 rearwardly of the clutch plate 43 and is provided with a thrust collar 46 pivotally carried within an annular support ring 47 rockably supported by the housing of the transmission unit 37 at 48. Obviously, rocking movement of the lower portion of annular ring 47 away from the housing of unit 37 will shift the collar 46 and thrust bearing 45 axially of the input shaft 36, thus pressing clutch plate 43 against clutch face 35' and rigidly connect the pulley 35 to the input shaft 36. As long as the bottom portion of the ring 47 is held removed from the housing of unit 37 the clutch 43 remains engaged with the clutch face 35' of the pulley 35. To provide this holding function we have supplied a horizontally extending yoke 49 pivoted at 50 to the housing of unit 37 and provided with a horizontal lip 51 at the end opposed to its pivotal connection 50. The bell crank 39 is shown to include a disc 52 having a cam-like peripheral edge face 53 in which there is a slot 54 adapted to receive the tongue 51. When the tongue 51 is disposed within the slot 54 as indicated in Figures 4, 5 and 6, the yoke is disposed in near spaced relation to the housing of unit 37 and the clutch 43 is disengaged from the face 35'. When it is desired to engage the clutch 43 the yoke 49 is shifted away from the housing of unit 37 and the lower end of the ring 47 is shifted thereby through linkage including a depending rod 55 secured in the ring 47 and having an adjustable set bolt 56 threaded therethrough and bearing against the saddle portion 57 of the yoke 49. To move the yoke 49 outwardly we provide an electric solenoid 60 which has a mechanical linkage 61 connected to the stem 62 welded or otherwise secured adjacent to the outer end of the yoke 49. It will thus be seen that electrically energizing the solenoid 60 will cause the lip 51 to be removed from the slot 54 thus simultaneously engaging the clutch 43. Through the transmission unit 37 output shaft 38 is rotated and bell crank 39 operates to reciprocate the table 17. Momentary energization of the solenoid 60 is all that is required to cause the table to reciprocate since the tongue or lip 51 rides upon the cam face 53 of the bell crank disk 52 and maintains the clutch 43 in engagement with the driving pulley 35. As the bell crank 39 completes one revolution the lip 51 again drops in the slot 54 permitting the clutch to disengage, with the table disposed at its initial rectilinear position. As indicated in the diagrammatic view of Figure 8 the tubing T, or other object to be cut by the saw 24, is adapted to strike a switch S which is secured in series with the solenoids 60 and the power source, thus a predetermined length of the tubing T may be cut automatically without manual assistance. If desired however, the switch may be operated manually and selective lengths of tubing may be cut thereby.

Even though we have described the present application of the invention as embodying a circular saw adapted to cut off tubing, we wish it to be understood that other types of saws may be employed to cut off other moving objects or even stationary objects if desired, and we do not wish to be limited by the disclosed embodiment of this invention.

Having thus described our invention, we claim:

1. In a cut off saw for moving objects having a rotatably powered saw arbor journaled on a supporting frame axially parallel to the movement of the object to be cut off and transversely movable into and out of cutting position; a circular saw rotatably fixed on said arbor and longitudinally slidable axially thereon; and means biasing said saw toward one end of said saw arbor and yieldable to effect sliding movement of said saw longitudinally of said saw arbor by pressure applied thereto from the saw kerf formed in the object by the saw to the opposed end thereof.

2. A cut-off saw for axially advancing elongated material comprising a frame disposed adjacent to the path of movement of said material and supported for rectilinear movement toward and away from said material; a saw arbor journaled on said frame axially parallel to the movement of said material; a driven circular saw rotatably fixed to said arbor for rotation therewith and longitudinally slidable thereon and disposed to cut said advancing material during the rectilinear movement of said frame; means yieldably biasing said saw longitudinally of said arbor toward one end thereof in the direction from which said material advances, said saw being shifted toward the opposed end of said arbor by axial pressure applied thereto by said advancing material.

3. A cut-off saw for axially advancing elongated material comprising a supporting frame; a table carried by said frame and reciprocal laterally of said advancing material in a cutting stroke; a saw arbor journaled on said table and axially disposed transversely to the cutting stroke of said frame and parallel to the movement of said elongated material; a circular saw carried by said saw arbor and fixed for rotation therewith and longitudinally slidable thereon; said cutting stroke of said table effecting movement of said saw into and out of the path of movement of said advancing elongated material; resilient means urging said saw to a normal position at one end of said arbor and movable axially to the opposed end thereof by means of axially parallel pressure applied direct to the saw by said advancing material; power means for rotating said saw arbor; and other means actuable by said advancing material adapted to selectively reciprocate said table through said cutting stroke.

4. A cut-off saw comprising an endless powered saw slidable longitudinally of and rotatably fixed with respect to an elongated rotating arbor fixed against axial movement and adapted for lateral movement to shift said saw into and out of cutting relationship with an object moving substantially parallel to the axis of said arbor; yieldable biasing means releasably holding said saw in a normal axial position relative to the arbor; said saw being movable along said arbor parallel to the direction of movement of said object by axially parallel pressure applied thereto from the saw kerf formed in the object by the saw.

References Cited in the file of this patent

UNITED STATES PATENTS

| Number | Name | Date |
| --- | --- | --- |
| 1,367,564 | Pritchard | Feb. 8, 1921 |
| 2,352,278 | Manley | June 27, 1944 |
| 2,534,977 | Kling | Dec. 19, 1950 |
| 2,618,047 | Mansell | Nov. 18, 1952 |
| 2,637,353 | Hyslop | May 5, 1953 |